United States Patent
McGeoch (10) Patent No.: US 8,440,988 B2
(45) Date of Patent: May 14, 2013

(54) PULSED DISCHARGE EXTREME ULTRAVIOLET SOURCE WITH MAGNETIC SHIELD

(75) Inventor: Malcolm W. McGeoch, Little Compton, RI (US)

(73) Assignee: PLEX LLC, Fall River, MA (US)

( * ) Notice: Subject to any disclaimer, the term of this patent is extended or adjusted under 35 U.S.C. 154(b) by 339 days.

(21) Appl. No.: 12/964,385

(22) Filed: Dec. 9, 2010

(65) Prior Publication Data

US 2012/0146510 A1 Jun. 14, 2012

(51) Int. Cl.
*G21G 1/00* (2006.01)
(52) U.S. Cl.
USPC ............. 250/504 R; 250/496.1; 250/497.1; 250/493.1; 250/491.1
(58) Field of Classification Search ............. 250/504 R, 250/496.1, 497.1, 494.1, 493.1, 491.1; 315/111.21, 315/111.22, 111.11, 111.01, 111.31, 111.41, 315/111.71
See application file for complete search history.

(56) References Cited

U.S. PATENT DOCUMENTS

| | | |
|---|---|---|
| 5,504,795 A | 4/1996 | McGeoch |
| 6,541,786 B1 | 4/2003 | Partlo et al. |
| 7,479,646 B2 | 1/2009 | McGeoch |
| 2009/0212241 A1 | 8/2009 | McGeoch |
| 2011/0068691 A1* | 3/2011 | Scherer et al. ........... 315/111.31 |

OTHER PUBLICATIONS

Shroff et al., "EUV Pellicle Development for Mask Defect Control", Proc SPIE, vol. 6151, paper 615104 (2006), 10 pages.

* cited by examiner

*Primary Examiner* — Tuyet Thi Vo
(74) *Attorney, Agent, or Firm* — Wolf, Greenfield & Sacks, P.C.

(57) ABSTRACT

A magnetically shielded, efficient plasma generation configuration for a pulsed discharge extreme ultraviolet (EUV) light source comprises two opposed convex electrodes mounted with axes parallel to a static magnetic field. A limiter aperture disposed between the electrodes, in conjunction with the field lines, defines a hollow plasma cylinder connecting the electrodes. A high pulsed voltage and current compresses the plasma cylinder and its interior magnetic field onto the electrode surfaces to create a magnetic insulating layer at the same time as propelling the working gas from each side toward the space between the electrode tips. The plasma then collapses radially in a three-dimensional compression to form a dense plasma on the axis of the device with radiation of extreme ultraviolet light.

12 Claims, 6 Drawing Sheets

PULSED DISCHARGE EXTREME ULTRAVIOLET SOURCE WITH MAGNETIC SHIELD

BACKGROUND OF INVENTION

Many discharge-based extreme ultraviolet (EUV) sources require the launching of high currents (10 kA or more) off electrode surfaces [for example, U.S. Pat. No. 5,504,795 "Plasma X-Ray Source", McGeoch (1996); U.S. Pat. No. 6,541,786 "Plasma Pinch High Energy with Debris Collector", Partlo et al., (2003)]. A principal and long-standing problem associated with this activity is a degree of electrode heating and erosion that limits the peak current, pulse duration and pulsed operating life of such devices. The default mode at very high current is "super-emission" of electrons from an extremely hot surface created by ion bombardment but this condition is still accompanied by evaporation of electrode material. In a previous US patent filing [U.S. application Ser. No. 12/854,375 "Z-Pinch Plasma Generator and Plasma Target", McGeoch (2010)] there has been disclosed a magnetically-assisted cathode with two advantages over conventional cathodes. Firstly, azimuthal drift of electrons in the crossed electric field of the plasma-electrode sheath and the applied magnetic field spreads the current very uniformly, thereby eliminating surface hot spots. Secondly, the spiralling path of surface secondary electrons produces more efficient ionization by maintaining the electron energy close to the energy of the maximum ionization cross section, so ion impacts on the surface that produce secondaries are less energetic, and hence there is reduced sputtering and surface heating. In the applicant's laboratory, cathodes based on this principle have produced >8 kA current pulses of 2 µsec duration for more than 100 million pulses with negligible surface erosion, in a Z-Pinch plasma-generating device running on a mixture of helium and lithium.

The magnetically-assisted cathode has been operated in a concave cathode configuration for Z-pinch generation [U.S. application Ser. No. 12/854,375 "Z-Pinch Plasma Generator and Plasma Target", McGeoch (2010)]. While this approach confers the above advantages of uniformity and more efficient electron amplification, it does not provide magnetic shielding of the electrode from the converging hot plasma. Also, the concave approach does not provide focusing of the compressed gas in any more than two dimensions, i.e. a cylindrical plasma shell is compressed without length change onto the axis of the device, so the line density of the pinch is limited. However, when extreme ultraviolet light (EUV) generation from lithium vapor is attempted, a high line density is needed in the pinch, and it is difficult to arrange this via two-dimensional compression alone, because of a limited available lithium vapor pressure.

SUMMARY OF INVENTION

The present invention introduces three-dimensional compression of a working gas, which may be lithium vapor, via the use of convex, tapered magnetically-assisted electrodes. An initial cylindrical plasma shell is defined by the intersection of the magnetic field lines with a circular aperture perpendicular to the common axis of the electrodes and the field. The electrodes are arranged with convex surfaces opposed, so that when the plasma shell is compressed by the pinch effect of a high current, the interior magnetic field is compressed onto their surface, and the working gas is impelled toward the central inter-electrode gap. There is thus a three-dimensional gas compression and many times greater pinch density than from two-dimensional compression.

The first function of the applied magnetic field (the magnetic assist) is to spread the initiation plasma azimuthally via ExB drift. The azimuthal symmetry is essential to the final formation of a hot plasma precisely on the device axis. Because the plasma responds to the applied voltage pulse via increased surface ionization, there is a skin depth limitation to the radial extent of dense plasma. A cylindrical shell of plasma therefore forms, guided by the applied magnetic field, and defined at its outer surface by the size of the circular aperture. The ends of the cylinder are located where the applied magnetic field intersects the electrodes.

The next function of the field is to protect the electrodes from plasma heat. When a short high current pulse is passed down the plasma shell between the electrodes, the shell begins to move inward and to compress the interior magnetic field, which can not enter the electrodes on the timescale of the current pulse. The field is sandwiched between the incoming plasma shell and the electrodes, so that it forms a high field insulating layer, preventing plasma heat from reaching the electrodes. For this to be the case, the diffusion time of the plasma shell across the applied magnetic field has to be much longer than the compression time.

The inward moving plasma shell squeezes the working gas from each end toward the center, so that a beneficially high density is achieved when the shell approaches the center from all directions. As the shell converges on the axis of the device, compressional heating and ionization of the working gas occurs. The high current that is flowing by that time becomes a major source of Ohmic heating, contributing the energy that is converted through ionic excitation into EUV radiation. The current path remains on the outside surface of the magnetic layer that protects the electrodes, and does not concentrate at the electrode tips, thereby avoiding excessive local heating and sputter erosion. The much higher temperature and density near the axis provide locally a rate of magnetic field diffusion sufficient to allow the high current to penetrate as far as the axis.

In accordance with embodiments of the invention, a pulsed generator of a pinch plasma is provided. The pulsed generator comprises two opposed coaxially aligned electrodes with convex profiles; a steady magnetic field applied parallel to the common axis of the electrodes; a limiter disc located between the electrodes with a hole centered on the axis, and a fill of low pressure gas, wherein: a pulsed voltage between the electrodes drives a current initially in a cylindrical sheet of diameter defined by the said hole, the current sheet being collapsed by the plasma pinch effect onto the convex surfaces of the electrodes, compressing the static magnetic field into a protective sheath over each surface, and forming a dense, high temperature plasma pinch on the axis between the electrodes.

BRIEF DESCRIPTION OF DRAWINGS

For better understanding of the present invention, reference is made to the accompanying drawings, which are incorporated herein by reference and in which.

DETAILED DESCRIPTION

Figure 1A:
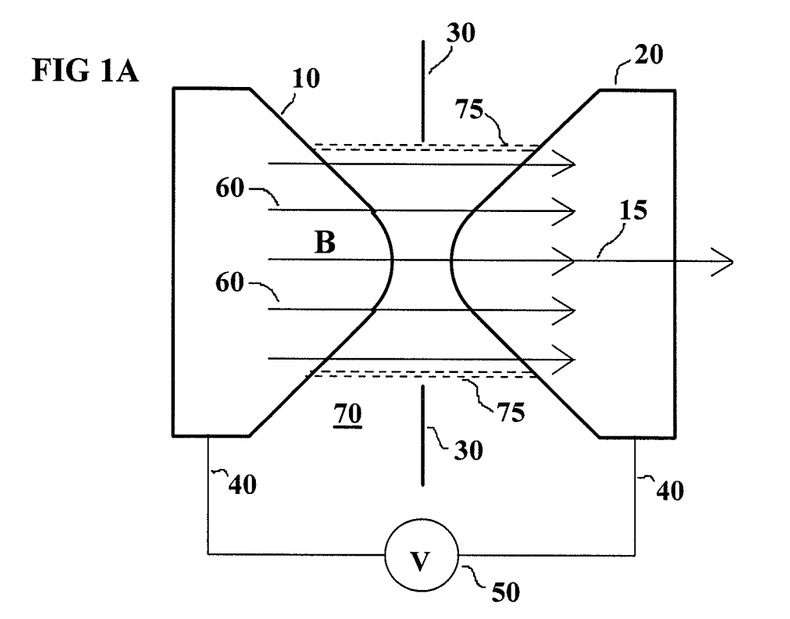
FIG. 1A is a cross-sectional view of a plasma generation configuration with cylindrical symmetry, in accordance with an embodiment of the invention.

The operation of a first embodiment of the invention is described with reference to FIGS. 1A and 1B, which show two stages of plasma evolution in an electrode configuration with cylindrical symmetry about axis of rotation 15. Electrodes 10, 20 have rotational symmetry about axis 15 and are opposed, with convex surfaces facing each other. A disc 30 with a central circular hole is positioned mid-way between electrodes 10, 20 with its center on the symmetry axis 15. A pulsed voltage and current generator 50 is connected via conductors 40 across electrodes 10, 20. Generator 50, in a preferred embodiment of the invention, supplies pulses of alternating polarity to the electrodes. A steady applied magnetic field B is present, with field lines 60 parallel to the axis of symmetry 15. A working gas 70 fills the inter-electrode space. This gas may be chosen for its spectral line emissions to match the wavelength required for an application. For example, lithium vapor is chosen for the generation of 13.5 nm light useful in the patterning of semiconductors, the radiating species being the doubly-ionized $Li^{2+}$ state.

In a preferred embodiment of the invention, the voltage and current pulses are applied at a sufficiently high frequency for there to be residual ionization in gas 70 at the time of the succeeding pulse. In the case of lithium vapor this frequency would have to exceed approximately 1 kHz. Rapid application of the voltage pulse initiates ionization in a cylindrical plasma shell 75, defined by the inner diameter of annular disc 30, and the steady applied magnetic field lines 60 that run perpendicular to the disc. The thickness of the shell is related to the plasma skin depth at the frequency components within the applied voltage pulse. The plasma shell is initiated with excellent azimuthal uniformity owing to the azimuthal drift of surface-produced secondary electrons, described below with reference to FIGS. 2A and 2B. As the applied current pulse ramps up, plasma shell 75 is accelerated inward by the self-magnetic field of this current interacting with the electrons carrying the current—the so-called pinch effect.

Figure 1B:
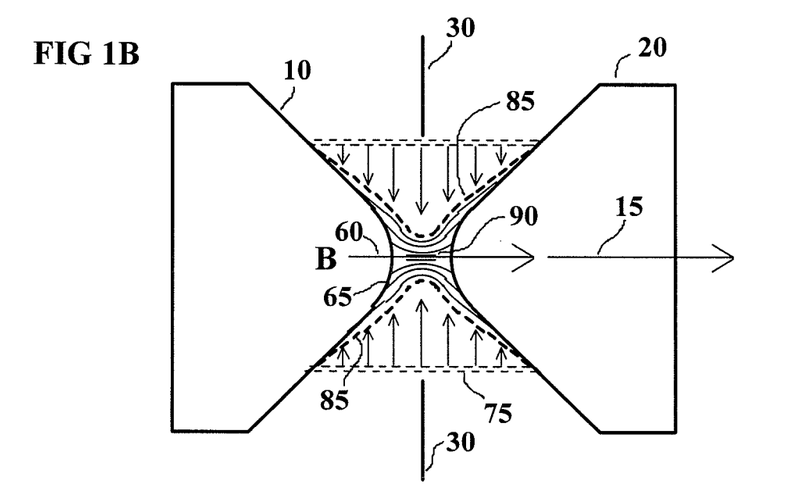
FIG. 1B is a cross-sectional view showing the converging plasma shell within the configuration of FIG. 1A.

In FIG. 1B a later location 85 of the plasma shell is shown. In this snapshot the ends of the shell nearest the electrodes have compressed the interior magnetic field lines into a thin layer 65 over the electrode surfaces, and the field amplitude in this layer increases toward the electrode tips. The field can not enter the electrodes by more than the electrode skin depth, which is rather small for the MHz frequency components of interest. The working gas that had formerly been around the outer parts of the electrode has been squeezed by the converging plasma shell and propelled toward the center of the device. In the last stage of compression, a dense gas cylinder 90 has formed between the electrode tips, and because of inertial energy delivered at stagnation on axis, the gas has been heated to high temperature, possibly through several stages of ionization. The continued input of heat via dissipation of the applied current (Ohmic heating) supplies energy for the emission of short wavelength radiation. The applied current is launched at the outer ends of the electrodes and guided by the surface contours, without contact, by virtue of magnetic insulation to converge at the highest density position within cylinder 90 and deposit heat.

Figure 2A:
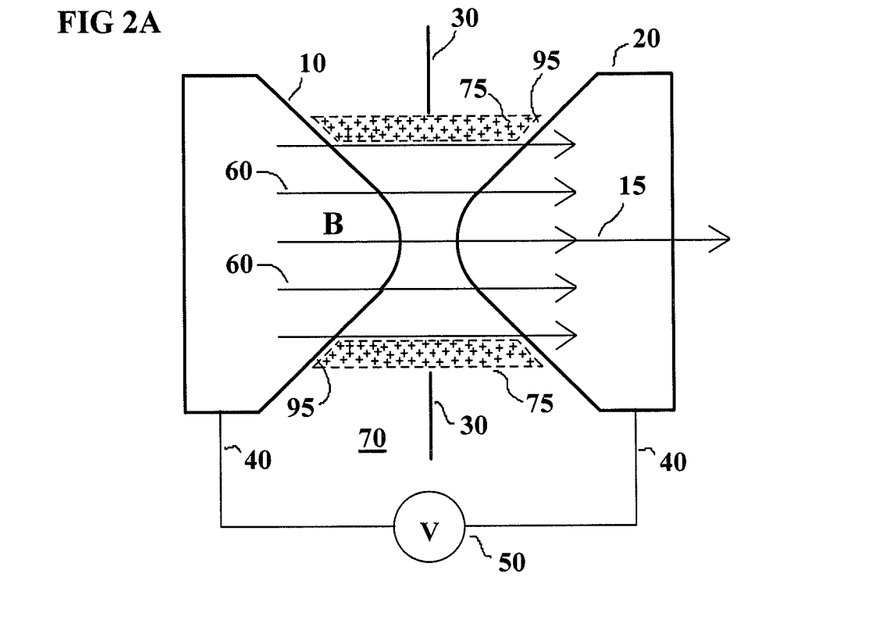
FIG. 2A is a cross-sectional view of the plasma initiation in one embodiment of the invention.
Figure 2B:
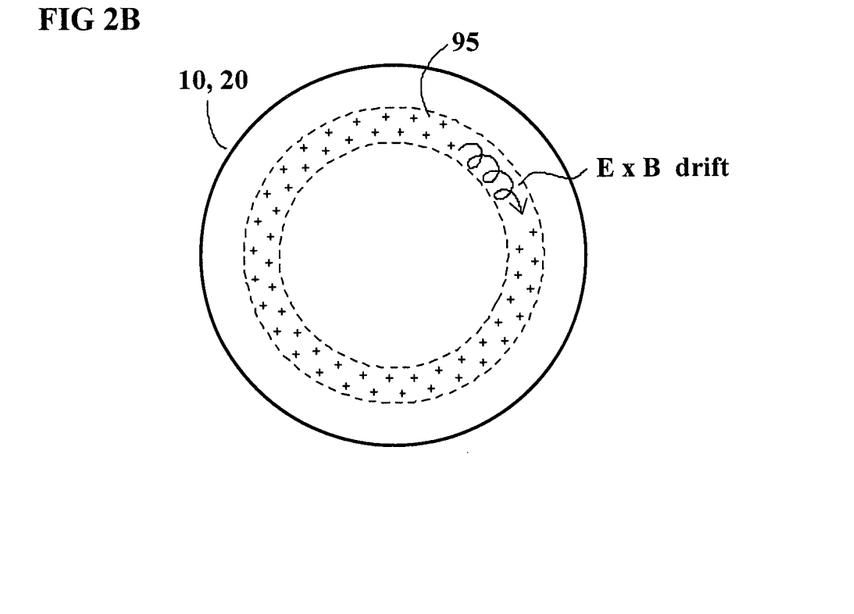
FIG. 2B is a cross sectional view of the electrode configuration of FIG. 2A, along the axis thereof.

FIGS. 2A and 2B illustrate the development of an azimuthally uniform plasma shell. In FIG. 2A an initial low density plasma shell 75 has developed in response to the application of voltage from generator 50. Where shell 75 meets electrodes 10, 20 there is a plasma sheath 95 across which there is a voltage drop, and an electric field oriented perpendicular to the electrode surface. Secondary electrons leaving the surface execute a crossed-field, or ExB drift, as shown in FIG. 2B. The azimuthal motion of these electrons ensures good azimuthal symmetry, both in location and density, of plasma shell 75 prior to its inward motion under the plasma pinch effect, described above with reference to FIGS. 1A and 1B. This high degree of symmetry ensures an accurate final location for dense plasma 90.

Figure 3:
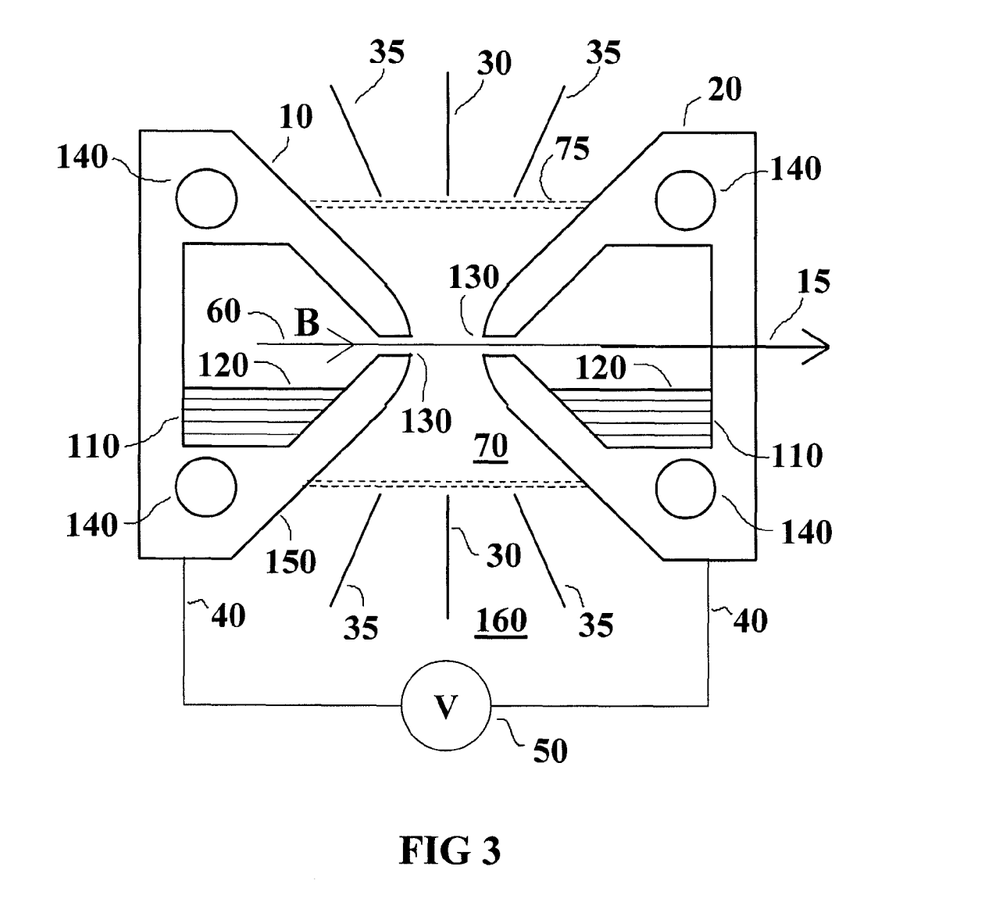
FIG. 3 is a cross-sectional view of a plasma generation configuration incorporating lithium enclosures within its electrodes and a plurality of limiter discs.

In a second embodiment of the invention, illustrated in FIG. 3, there is provision for the use of a working gas such as lithium, for which a useful density may be obtained via evaporation from a heated reservoir of liquid metal. In this case, electrodes 10, 20 have internal reservoirs 110 that contain an amount of the liquid metal 120. Aperture holes 130 located on the axis of symmetry 15 communicate the metal vapor into the operating gas volume 70. Lithium (or the metal in question) is evaporated either by spare heat from the electrodes or by installed heaters 140 within the electrodes, or by a combination of these. It is contained by a wide angle heat pipe [U.S. Pat. No. 7,479,646 "Extreme Ultraviolet Source with Wide Angle Vapor Containment and Reflux", McGeoch (2009)] of which the conical condensation and return surface structures 30, 35 are shown. Three such structures, each with two surfaces having rotational symmetry around axis 15, are shown in FIG. 3, but there may be a plurality of such structures. The electrode outer surfaces 150 are also part of the heat pipe. In the case of lithium gas, a helium buffer gas 160 is present in the outer parts of the heat pipe, to contain lithium as described in [U.S. Pat. No. 7,479,646 McGeoch (2009)]. In steady operation, heat from the electrical discharge driven by pulser 50, augmented if necessary by heaters 140, maintains a temperature in the electrode reservoirs 110 appropriate for the metal vapor density desired in the discharge region 70. Additionally, the temperature of the inner boundary of heat pipe structures 30,35 is raised in steady operation via the delivery of exhaust plasma heat or via other heater means, to a similar temperature to reservoirs 110, facilitating the re-evaporation of metal that has flowed inward after condensing on structures 30, 35. All surfaces in contact with metal vapor are therefore at similar temperature, ensuring that there is not a net migration of metal onto any one cool spot in the device. Having established the desired operating density of metal vapor, the operation of the plasma generation configuration proceeds as described above with reference to FIGS. 1A and 1B, in which the numbering coincides with FIG. 3.

Figure 4:
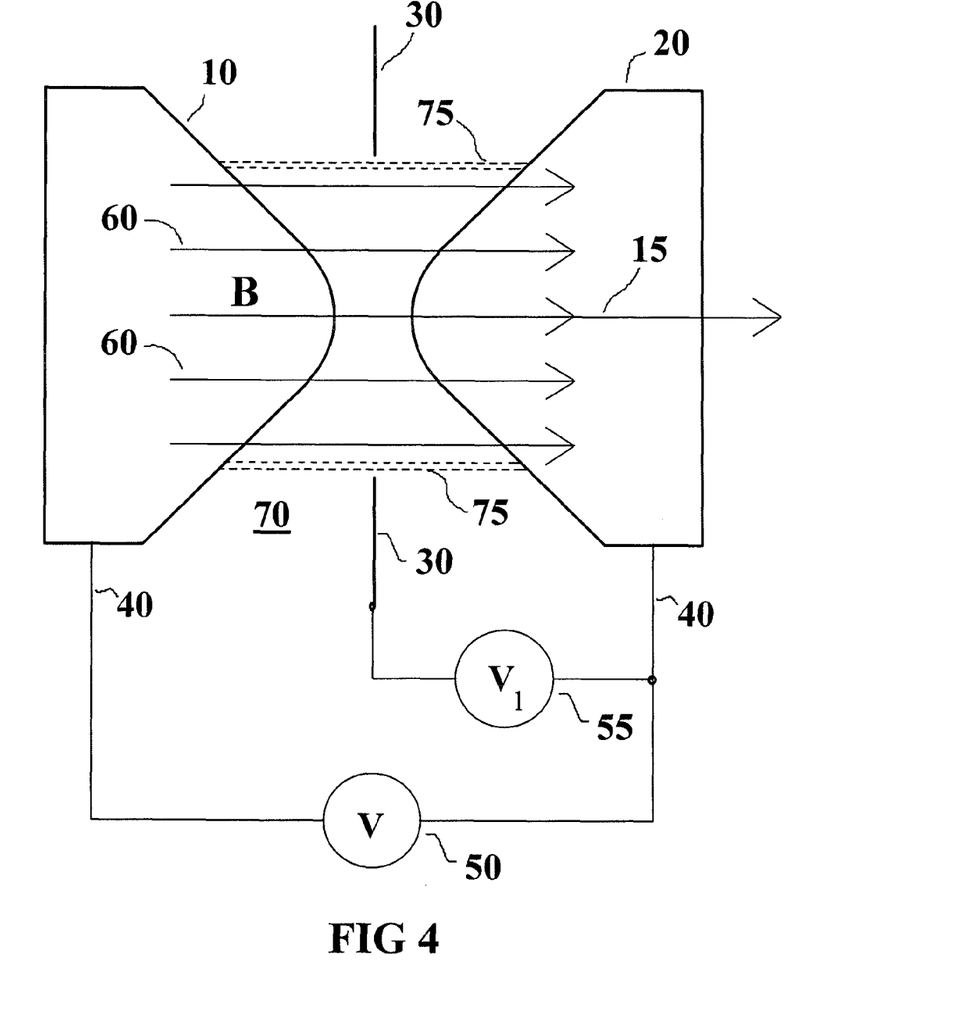
FIG. 4 is a cross-sectional view of a plasma generation configuration with an initiation pre-pulse generator.

In a further embodiment of the invention, illustrated in FIG. 4, there is an ignition voltage pulse $V_1$ supplied by generator 55 to limiter disc 30 in the period prior to the main high voltage pulse V that is supplied by generator 50. In the plasma generator, the electrodes 10,20 are typically connected to each other through low impedance pulse generator 50, so that a voltage $V_1$ applied between one of the electrodes 10, 20 and the limiter disc 30 is typically also experienced between the other electrode and disc 30. Ignition generator 55 is typically a higher impedance generator than 50, so it does not deliver a significant current or contribute a significant pinch effect prior to the main current pulse delivered from generator 50. However, it serves to create a base ionization from which an ionization avalanche may occur to create plasma shell 75 upon application of the main pulse.

Figure 5:
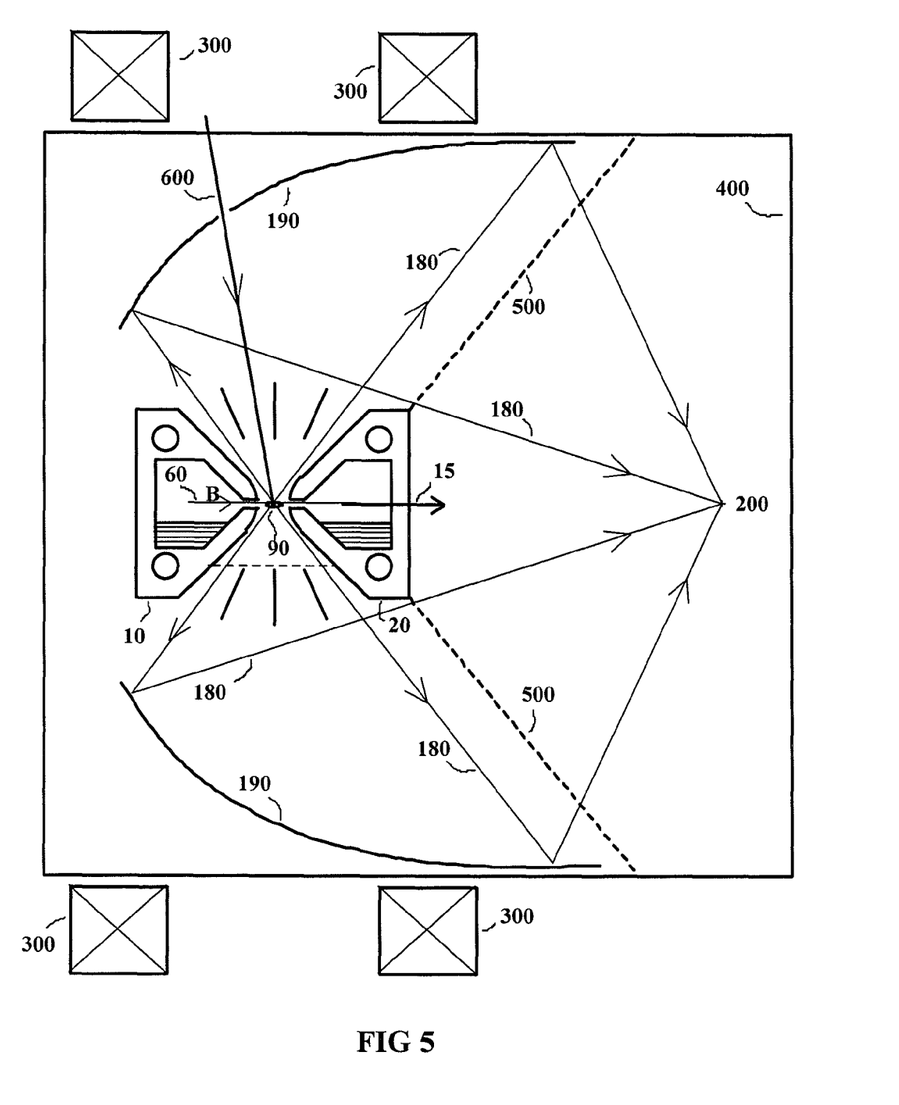
FIG. 5 is a cross-sectional view of an EUV source system that incorporates an embodiment of the plasma generation configuration.

The plasma generation configuration of the present invention may be incorporated into an EUV source system, one embodiment of which is illustrated in FIG. 5. In that Figure an embodiment of the plasma generation configuration is located within vacuum chamber 400, which may have rotational symmetry about axis 15. The required static magnetic field 60 (labelled B) is provided by Helmholtz coils 300, which may be located outside of chamber 400. Mirror 190, which may be of ellipsoidal section, re-focuses EUV light rays 180 from dense plasma region 90 toward position 200, where the radiation may be used. Barrier 500 is substantially transparent to the EUV light but presents a barrier to the movement of the working gas, or the helium buffer gas, in the case of a metal vapor contained in a wide angle heat pipe. This allows isolation of the point of use 200 located in region 420 from the from the working gas or buffer gas located in region 410. Barrier 500 may consist of narrow passages parallel to the reflected rays, presenting a high impedance to the flow of gas, but transmitting most of the EUV light. Alternately, or in conjunction with the first, barrier 500 may comprise a thin membrane that transmits most of the EUV light, mounted on a support mesh. This type of membrane is well known in the literature and has been further developed for use with EUV light by Shroff et al. [Proc SPIE 6151 paper 615104 (2006)]. Laser beam 600 can be focused onto dense plasma 90 in order to enhance EUV generation in a small interaction region, thereby increasing the brightness of the EUV source in a Laser Heated Discharge Plasma (LHDP) source [US Patent Publication No. US 2009/0212241, "Laser Heated Discharge Plasma EUV Source", McGeoch (2009)]. Laser beam 600 enters chamber 400 through a lens or a window (not shown in FIG. 5) and passes through a hole in the collection mirror 190 to reach the center of the device. Other arrangements of the same components are possible, including ones in which the symmetry axes of the chamber or the ellipsoidal mirror are not parallel to symmetry axis 15 of the plasma generation configuration. The foregoing is only one example of many different systems that may incorporate as a sub-component the present invention as defined in the claims attached hereto, and is not to be construed as limiting the scope of the present invention.

Figure 6:
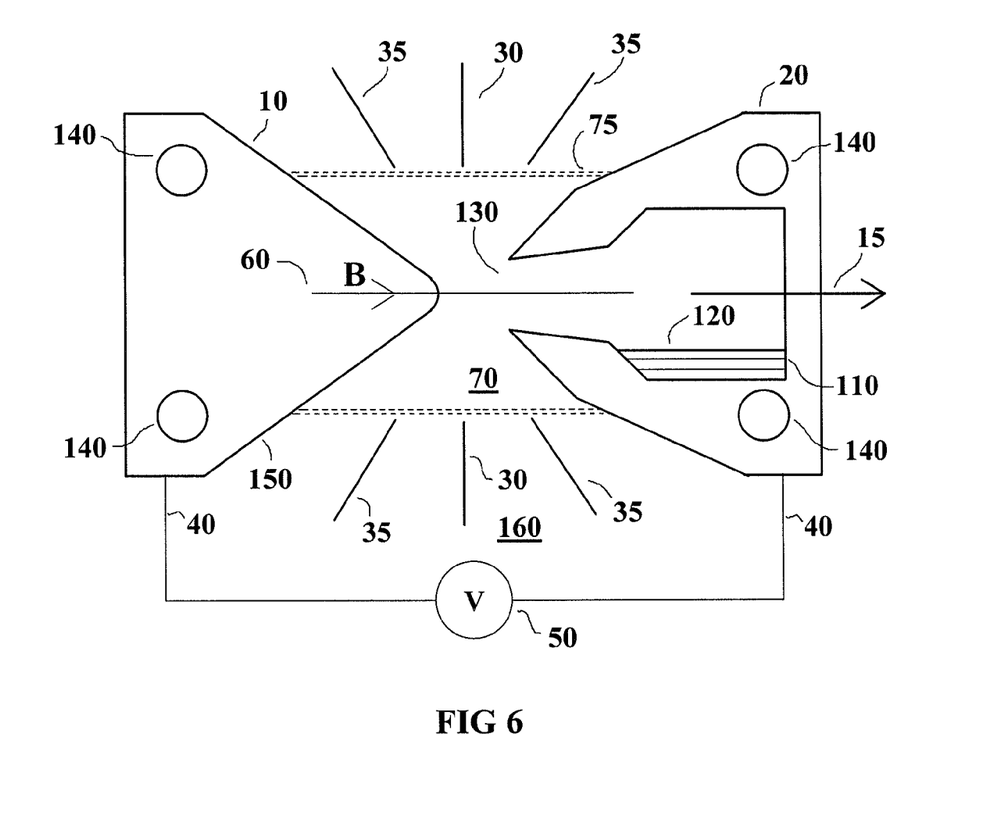
FIG. 6 is a cross-sectional view of an asymmetric plasma generation configuration, in accordance with an embodiment of the invention.

A further embodiment of the invention is illustrated in FIG. 6. This embodiment shows an asymmetrical electrode pair 10,20, both convex in accordance with the invention, but each electrode having a different convex outer profile, and only one electrode (20) having a central hole 130 with access to a liquid metal reservoir 110. This embodiment has three limiter discs 30,35,35 that constitute a wide-angle heat pipe for capture and recirculation of metal vapor. Operation is as described with reference to FIG. 3. All possible asymmetrical configurations are implied in the scope of the invention.

At least one embodiment of the invention has been brought to practice in the laboratory of the applicant. In one such embodiment, the diameter of the hole in the limiter disc was 25 mm, and the length of the starting plasma cylinder was 30 mm. A steady magnetic field of 0.04 T was applied parallel to the axis of the generator, and symmetrical electrodes with a 3 mm diameter central hole were employed, giving access to chambers containing lithium. In operation a helium pressure of 2.5 torr was used to contain lithium in the wide angle heat pipe. Four limiter discs were used and a pre-ignition pulse was applied to the central two of these. A pulse of duration 2 μsec and peak current 10 kA was applied in order to compress the plasma shell. The generator was pulsed at up to 2 kHz and produced several hundred watts of 13.5 nm extreme ultraviolet radiation. This is only one example out of many possible embodiments that differ widely in physical scale, and require different peak currents, pulse durations or applied magnetic field, depending upon the working gas and wavelength requirements.

Further realizations of this invention will be apparent to those skilled in the art. Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A pulsed generator of a pinch plasma comprising:
   two opposed coaxially aligned electrodes with convex profiles;
   a steady magnetic field applied parallel to the common axis of the electrodes;
   a limiter disc located between the electrodes with a hole centered on the axis, and a fill of low pressure gas, wherein:
   a pulsed voltage between the electrodes drives a current initially in a cylindrical sheet of diameter defined by the said hole, the current sheet being collapsed by the plasma pinch effect onto the convex surfaces of the electrodes, compressing the static magnetic field into a protective sheath over each surface, and forming a dense, high temperature plasma pinch on the axis between the electrodes.

2. A generator as in claim 1, driven by an alternating pulsed voltage.

3. A generator as in claim 1, in which the pulse frequency is sufficiently high for partial gas ionization to persist between pulses.

4. A generator as in claim 1, in which an ignition voltage pulse is applied to the limiter disc prior to the application of the main current pulse.

5. A generator as in claim 1, in which the convex electrode profiles are substantially conical.

6. An extreme ultraviolet source system comprising at a minimum the plasma pinch generator of claim 1, a collector reflective optical element, and means to reduce the working gas pressure along the path from the plasma to the point of use.

7. A generator as in claim 1, with a plurality of limiter discs distributed between the electrodes.

8. A generator as in claim 7, in which the working gas is a metal vapor contained by helium gas in a wide angle heat pipe, the limiter discs having conical shapes and comprising the metal vapor condensation and return surfaces of the heat pipe.

9. An extreme ultraviolet source based on the 13.5 nm emission of doubly-ionized lithium energized by a plasma pinch formed in the plasma generator of claim 8.

10. An extreme ultraviolet source based on the emission of a metal ion energized in the plasma pinch generator of claim 8 with the plasma further heated in a small volume by a pulsed laser to enhance EUV emission from the heated region.

11. An extreme ultraviolet source based on the 13.5 nm emission of doubly-ionized lithium energized in the plasma pinch generator of claim 8 with the plasma further heated in a small volume by a pulsed carbon dioxide laser to enhance 13.5 nm emission from the heated region.

12. A generator as in claim 8, in which metal vapor is charged and replenished by evaporation from a chamber internal to an electrode via a small hole on the axis of an electrode.

* * * * *